C. SCHRODER.
PUMP CONNECTION FOR PNEUMATIC TIRES.
APPLICATION FILED DEC. 2, 1915.
1,301,508.
Patented Apr. 22, 1919.
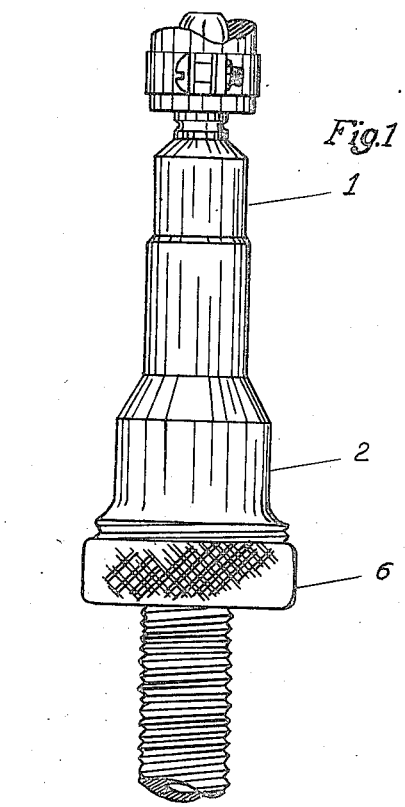
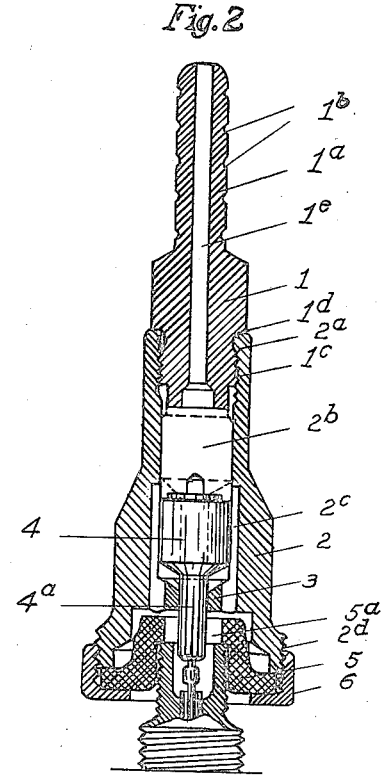
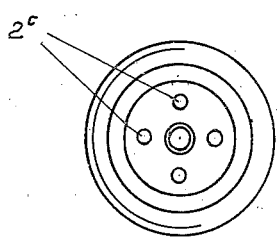
INVENTOR.
Carl Schroder.
BY A. B. Bowman
ATTORNEY

UNITED STATES PATENT OFFICE.

CARL SCHRODER, OF SAN DIEGO, CALIFORNIA.

PUMP CONNECTION FOR PNEUMATIC TIRES.

1,301,508.  Specification of Letters Patent.  Patented Apr. 22, 1919.

Application filed December 2, 1915. Serial No. 64,677.

*To all whom it may concern:*

Be it known that I, CARL SCHRODER, a citizen of the United States, residing at San Diego, in the county of San Diego and State of California, have invented certain new and useful Improvements in Pump Connections for Pneumatic Tires, of which the following is a specification.

My invention relates to a pump connection to be used more particularly for pumping pneumatic tires, and the objects of my invention are: first, to provide a pump connection of this class with means for reducing to a minimum the pressure required for opening the valve to pneumatic tubes; second, to provide a connection of this class which provides means for closing the outlet through the pump connection as soon as the pressure from the pump is stopped in case the tire valve sticks or fails to operate; third, to provide a device of this class which is simple and economical of construction, durable, easy of operation and will not readily get out of order, and fourth, to provide a pump connection of this class which fits the standard tire valve stems and air holes.

With these and other objects in view as will appear hereinafter, my invention consists of certain novel features of construction, combination and arrangement of parts as will be hereinafter described in detail and particularly set forth in the appended claim, reference being had to the accompanying drawings and to the characters of reference thereon which form a part of this specification, in which:

Figure 1 is a side elevational view of my device shown in connection with a fragmentary portion of a pump hose and fragmentary portion of a pneumatic tube valve stem. Fig. 2 is a sectional view of the same, minus the hose and showing a portion in elevation to facilitate the illustration, and Fig. 3 is a bottom view of the device, minus the gasket 5 and nut.

Similar characters of reference refer to similar parts throughout the several views.

The hose connecting piece 1, cylindrical piece 2, plunger 4, gasket 5, and nut 6 constitute the principal parts of my hose connection.

The hose connecting piece 1 is provided with a small end $1^a$ adapted for the ordinary pump hose, and it is provided in its outer surface with a plurality of circular recesses $1^b$, adapted for the more efficient connection of the hose thereto. This piece 1 is provided with an external thread $1^c$ on its lower end adapted to screw into the internal threads $2^a$ in the cylindrical piece 2, and the shoulder $1^d$ will rest tightly against the upper end of said cylindrical piece as shown best in Fig. 2 of the drawings. This connecting piece is also provided with a central longitudinal hole $1^e$ therethrough. The cylindrical piece 2 is provided with a hole $2^b$ therein in which the plunger 4 is adapted to reciprocate, the sides of which are also provided with ports $2^c$ in its walls adapted to allow the passage of air around the plunger 4 when said plunger 4 is down in the position shown in Fig. 2 of the drawing, and when the plunger 4 is raised by pressure from the tire by reason of the valve sticking or for any other reason as shown by dotted lines in Fig. 2 the air cannot pass through said cylindrical piece 2 until the plunger 4 has been forced down opening the upper ends of the ports $2^c$. At the lower end of this hole $2^b$ in the cylindrical piece 2 is a portion 3 provided with holes therethrough conforming to the port holes $2^c$, and it is also provided with a central hole for the reduced lower end $4^a$ of the plunger 4 to reciprocate therein. As the plunger reciprocates in the hole $2^b$, this portion 3 provides a stop for the movement of the plunger downwardly when pressure is brought to bear thereon through the air hose, and also as a guide for said plunger. The recess in the lower end of the cylindrical piece 2 is enlarged near the lower end, and shaped as shown best in Fig. 2 of the drawing, and in this recess is mounted the rubber gasket 5 shaped as shown best in Fig. 2 of the drawing. The lower end of this cylindrical piece 2 is provided with external threads $2^d$ upon which the nut 6 is adapted to screw and press tightly against the gasket 5 partially closing the hole $5^a$ in said gasket so that the same fits tightly upon the upper end of the valve stem.

Though I have shown and described a particular construction, arrangement of parts, I do not wish to be limited to this particular construction, combination and arrangement, but desire to include in the purview of my invention the construction, combination and arrangement substantially as set forth in the appended claim.

It is obvious that with this construction there is provided a hose connection for airpumps for pumping air into pneumatic tubes in which a larger area of pressure is exerted on the valve stem for opening the same thus reducing the quantity of pressure required from the pump for filling pneumatic tubes, that the air pressure being partly brought to bear upon the plunger 4 will cause slight movement of the valve stem thus preventing its being clogged or being caught in its open position, that if the valve sticks or fails to operate when the pump or pressure is shut off the plunger will be thrown back against the lower end of the connecting piece 1 and will prevent the air from passing out into the pump.

Having thus described my invention what I claim as new and desire to secure by Letters Patent is:

In a pump connection, the combination of a hose connecting element provided with a reduced exterior and an enlarged interior portion on its lower end forming a valve seat, a cylindrical element secured to the lower end of said connecting element provided with a recess in its lower end, a partition portion above said recess forming the bottom of said recess, a plurality of ports extending through said partition portion and upwardly therefrom in the inner walls of said cylinder-forming by-passes through said partition and in the inner surface of the wall of said cylinder, a plunger reciprocally mounted in said cylinder so that its upper end will pass the upper end of said by-passes when at the end of its downward stroke but will close said by-passes when raised slightly and provided with a downwardly extending portion adapted to engage the valve stem when in its downward position, a rubber gasket mounted in the recess in said cylindrical element adapted to fit snugly over the top end of a valve stem, and means for compressing the outer edge of said gasket whereby it will be made to fit snugly on the valve supporting stem.

In testimony whereof, I have hereunto set my hand at San Diego, California this 26th day of November 1915.

CARL SCHRODER.